United States Patent [19]

Dahlquist

[11] Patent Number: 4,744,262

[45] Date of Patent: May 17, 1988

[54] ARRANGEMENT FOR PROVIDING ENGAGEMENT WITHOUT BACKLASH BETWEEN A GEAR PINION AND A GEAR WHEEL COOPERATING THEREWITH

[75] Inventor: Håkan Dahlquist, Västerås, Sweden

[73] Assignee: Asea Aktiebolag, Västerås, Sweden

[21] Appl. No.: 4,637

[22] Filed: Jan. 20, 1987

[30] Foreign Application Priority Data

Jan. 21, 1986 [SE] Sweden ............................ 8600256

[51] Int. Cl.⁴ ................... F16H 55/18; F16C 27/00; F16C 27/06
[52] U.S. Cl. ................................ 74/409; 74/406; 74/421 R; 384/535; 384/557; 384/581
[58] Field of Search ............... 74/392, 398, 397, 399, 74/406, 384; 384/581, 582, 535, 536, 557; 267/158, 160; 74/409, 421 R

[56] References Cited

U.S. PATENT DOCUMENTS

| 106,360 | 8/1970 | Hamlin | 74/399 |
|---|---|---|---|
| 1,769,957 | 7/1930 | Krotee | 74/397 |
| 2,397,777 | 4/1946 | Colman | 74/399 X |
| 2,474,625 | 6/1949 | Gerow | 74/397 |
| 3,140,901 | 7/1964 | Young | 384/536 |
| 3,216,540 | 11/1965 | Blinn | 403/15 |
| 3,394,971 | 7/1968 | Bazeley | 384/535 |
| 4,226,485 | 10/1980 | Pruvot | 384/557 |
| 4,564,300 | 1/1986 | Schulze | 384/581 |
| 4,586,393 | 5/1986 | Mooney et al. | 74/406 X |

FOREIGN PATENT DOCUMENTS

| 63702 | 11/1982 | European Pat. Off. | |
| 1450712 | 7/1969 | Fed. Rep. of Germany | |
| 705558 | 6/1931 | France | 74/397 |
| 1237161 | 6/1971 | United Kingdom | |
| 1375214 | 11/1974 | United Kingdom | |
| 956867 | 9/1982 | U.S.S.R. | 74/397 |

Primary Examiner—Allan D. Herrmann
Attorney, Agent, or Firm—Watson, Cole, Grindle & Watson

[57] ABSTRACT

A cylindrical gear unit which includes a gear housing, a gear pinion and a gear wheel, the gear pinion being fixed to a shaft which is rotatably journalled in bearings supported by at least one bearing support. One of the bearing supports comprises a sleeve in which a roller bearing is fixedly mounted, a fixing plate supported by the gear housing, as well as a disc-shaped rib portion which interconnects the sleeve and the fixing plate. The rib portion extends substantially along the entire length of the sleeve and the fixing plate and is substantially parallel to a tangential plane on the contact line between the gear pinion and the gear wheel. In addition, at least one stop face for the sleeve is arranged at a small distance from the outside of the sleeve on at least that side of the sleeve facing away from the gear wheel.

6 Claims, 3 Drawing Sheets

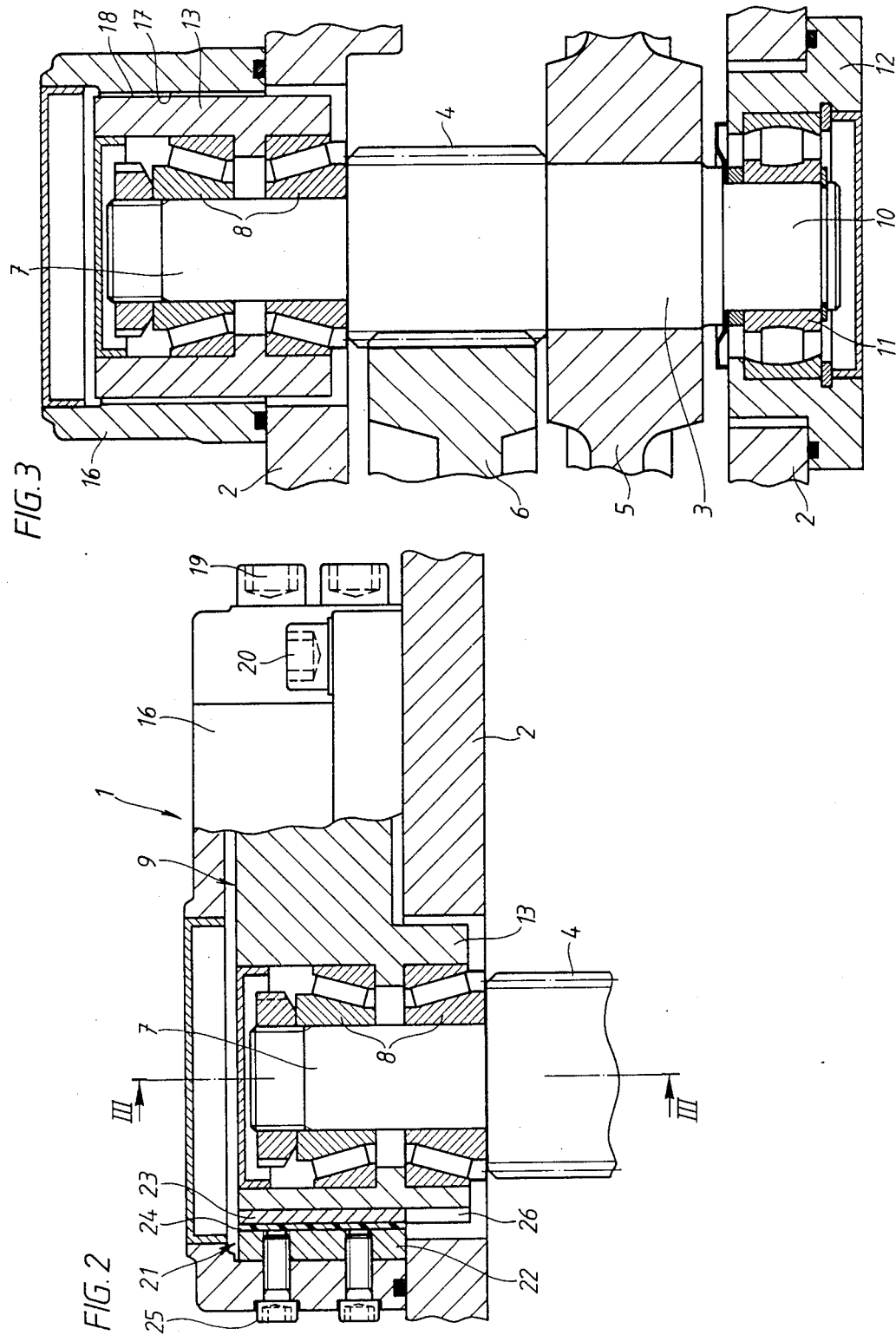

ARRANGEMENT FOR PROVIDING ENGAGEMENT WITHOUT BACKLASH BETWEEN A GEAR PINION AND A GEAR WHEEL COOPERATING THEREWITH

TECHNICAL FIELD

The invention relates to an arrangement for providing an engagement without backlash between a gear pinion and a gear wheel or the like, cooperating therewith, in a cylindrical gear unit, the gear pinion being fixed to a shaft which is rotatably journalled in bearings which are supported by at least one bearing support.

BACKGROUND ART

In cylindrical gear units the aim is to bring about an engagement between the various toothed wheels in the gear unit, which engagement is, as far as possible, free of backlash. However, due to manufacturing tolerances of the components of the gear unit, it is practically impossible to bring about a complete freedom from backlash while at the same time ensuring that too high loads, as a result of too hard an engagement between the gear wheels, do not occur. In addition, a variation of the engagement of teeth is obtained as a result of the thermal expansion if the components of the gear unit are manufactured from materials having different coeffients of thermal expansion, which is often the case; for example a steel gear wheel and a light metal gear housing. Within certain fields of application, for example cylindrical gear units which are used in industrial robots and the like for turning parts thereof, however, an engagement without backlash is required in order to obtain the desired high precision in the positioning of the parts. It has therefore been proposed previously to mount one of the shafts in the gear unit with a certain resilience, enabling it to move away somewhat from the other shaft to reduce the stresses in the case of too hard an engagement (cf. patent publications GB No. 1,237,161, GB No. 1,375,214, DE No. 1,450,712 and EP No. 63,702). However, these known arrangements are relatively complicated and hence expensive, and furthermore they are space demanding.

SUMMARY OF THE INVENTION

The object of the present invention is to provide an arrangement which, in a simple manner, enables an engagement without backlash between a gear pinion and a gear wheel cooperating therewith, which arrangement is simple in construction, easy to mount and has a long life with very great reliability in operation. This is provided by means of an arrangement of the kind described in the introduction, wherein one of the bearing supports includes a sleeve in which the associated roller bearing is fixedly mounted, a fixing plate which is supported by the gear housing, and a rib portion extending between the sleeve and the fixing plate, the rib portion allowing the sleeve to move when the gear wheel engages with the gear pinion on the shaft. In addition, a stop means is provided to limit the movement of the sleeve.

The invention will be better understood by reference to the attached drawings, taken in conjunction with the following discussion.

BRIEF DESCRIPTION OF THE DRAWING

FIG. 2 shows a section along the line II—II in FIG. 1 and also shows part of a gear unit on which the arrangement is mounted, FIG. 3 shows a section along the line III—III in FIG. 2 and through an additional part of the gear unit shown in FIG. 2.

DESCRIPTION OF THE PREFERRED EMBODIMENT

Figure 1:
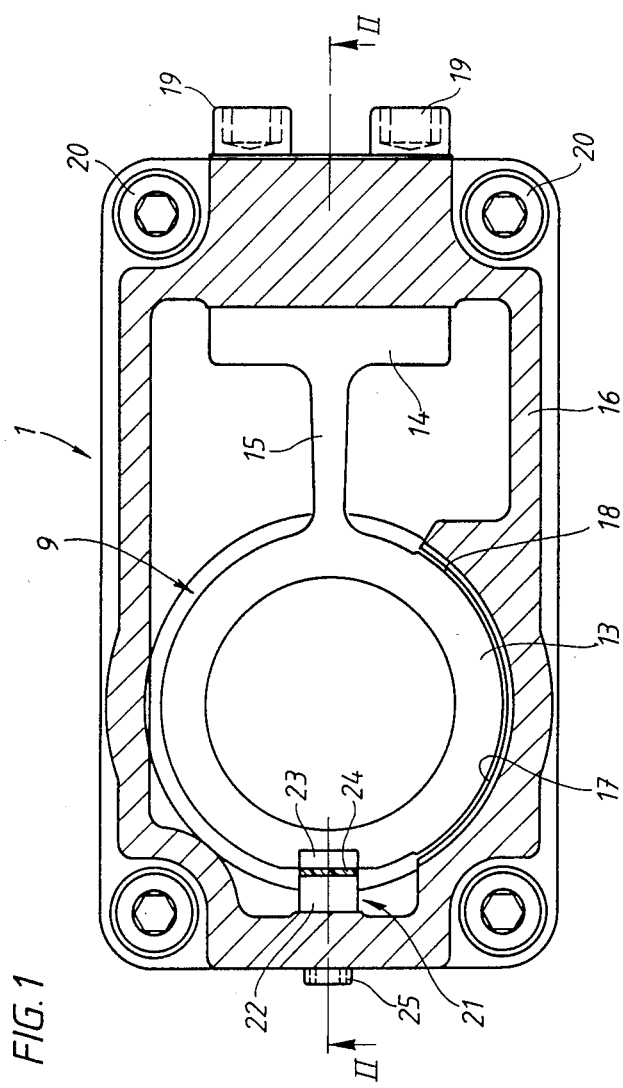
FIG. 1 is a partly cut side view of an arrangement according to one embodiment of the invention.

The drawings, especially FIG. 3, show parts of a cylindrical gear unit 1, which comprises a gear housing 2. In the housing 2 at least two shafts are rotatably journalled. In the drawing only one of these shafts 3 is shown, which supports a gear pinion 4 and a larger gear wheel 5. The gear pinion 4 cooperates with a gear wheel 6, only part of which is shown in FIG. 3 and which is supported by a shaft (not shown) which, in turn, is journalled in the housing 2.

That end of the shaft 3 which is located nearest the gear pinion 4 is formed with a shaft end 7 which is journalled, by means of two confronting taper roller bearings 8, in a bearing support 9. As will be clear from FIG. 3, the opposite end of the shaft 3 has a shaft end 10 which is journalled, by means of a spherical roller bearing 11, in a bearing support 12.

As is best shown in FIG. 1, the bearing support 9 comprises a sleeve 13, in which the roller bearings 8 are fixedly mounted, a fixing plate 14, and a rib portion 15 which interconnects the sleeve 13 and the fixing plate 14. The sleeve 13, the fixing plate 14 and the rib portion 14 are formed integral with each other.

The bearing support 9 is mounted in a case 16, which extends around the sleeve 13 spaced therefrom. Around part of the circumference of the sleeve 13, the case 16 is formed with a surface 17, which is concentric with the external surface of the sleeve 13 and is located such that a play 18 exists between the external surface of the sleeve 13 and the surface 17 when the bearing support 9 is unloaded. The surface 17 is located on that side of the sleeve 13 which faces away from the line of engagement of the gear pinion 4 with the gear wheel 6. In addition, the case 16 is formed with a fixing surface against which the fixing plate 14 is mounted by means of screws 19. The case 16, in turn, is attached to the housing 2 by means of screws 20.

As will be clear from the drawings, the rib portion 15 in the bearing support 9 extends substantially along the entire length of the sleeve 13 and the fixing plate 14 and, in addition, the rib portion 15 is substantially parallel to a tangential plane on the contact line between the gear pinion 4 and the gear wheel 6 cooperating therewith. As a result of the resilience in the material in the rib portion 15, the sleeve 13 is able to move somewhat under the influence of the forces at the engagement of teeth between the gear pinion 4 and the gear wheel 6. This movement is limited by the play 18 between the sleeve 13 and the surface 17, which play may be of the order of magnitude of a few tenths of a millimeter. However, the movement of the sleeve 13 is sufficient to be able to compensate for manufacturing tolerances and wear as well as for differences in thermal expansion by mounting the bearing support 9 with the sleeve 13 prestressed in a direction towards the surface 17, thus obtaining an engagement with no play between the gear pinion 4 and the gear wheel 6. The sleeve 13 is then able to move only substantially perpendicularly to the tangential plane on the contact line between the gear pinion 4 and the gear wheel 6, that is, the gear pinion 4 is able to move towards and away from the gear wheel 6. On the other hand, the sleeve 13 is not able to move in the tangential plane, neither in the axial direction nor in the tangential direction of the gear pinion 4, since the shape of the rib portion 15 prevents this. In this way the desired rigidity of the gear unit 1 is obtained as well as the possibility of accommodating the axial forces occurring if the gear pinion 4 and the gear wheel 6 are made with helical gears.

Figure 4:
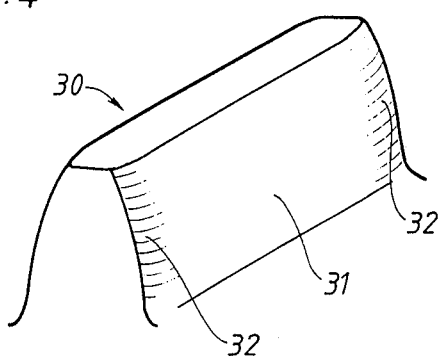
FIG. 4 is a perspective view of a gear tooth with face crowning.
Figure 5:
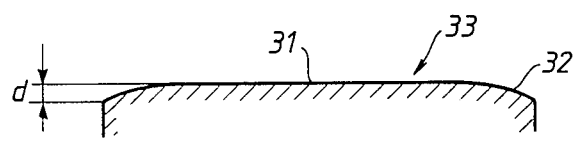
FIG. 5 shows the tooth curve of the gear tooth shown in FIG. 4.

The movement of the sleeve 13 results in a certain angular displacement of the shaft 3. This angular displacement of the shaft 3 is made possible by means of movement in the spherical roller bearing 11 at the opposite end of the shaft 3. In order to avoid faulty engagement between the teeth on the gear pinion 4 and on the gear wheel 6, it is suitable for the teeth of the gear pinion 4 and/or the gear wheel 6 to be made with facing crown, which is adapted to the possible angular displacement of the shaft 3 and compensates for the angular displacement. Face crowning means that the tooth surface (face) 31 of each gear tooth 30 is rounded at its edge portions 32, as shown in FIG. 4. FIG. 5 shows the tooth curve 33 of gear tooth 30, this being the curve of intersection of the tooth surface and its pitch surface. The degree of crowning is indicated by the dimension d.

In addition to the above-mentioned parts, FIGS. 1 and 2 also show a damping member 21 which is attached to the case 16. The damping member 21 consists of two strips 22 and 23 and a layer 24 of rubber or other material having corresponding elastic properties, which layer 24 is vulcanized or otherwise attached between the two strips 22 and 23. The strip 22 is fixed by means of screws 25 to the inside of the case 16, and the strip 23 is inserted, with no play, into a groove 26 in the outside of the sleeve 13. The object of the damping member 21 is to enable damping of self-oscillations, if any, of the bearing support 9.

The invention is, of course, not limited to the embodiments described above but modifications are possible within the scope of the appended claims.

What is claimed is:

1. In a gear assembly which includes a gear housing, first and second bearing support means supported by said gear housing, first and second roller bearings respectively supported by said first and second bearing support means, a shaft extending between and rotatably journalled in said first and second roller bearings, a gear pinion mounted on said shaft between said first and second roller bearings, and a cylindrical gear wheel that is engageable with said gear pinion along an imaginary contact line that lies within an imaginary tangential contact plane, the improvement wherein said first bearing support means comprises an elongated sleeve in which said first roller bearing is fixedly mounted, an elongated fixing plate fixedly supported by said gear housing, and an elongated rib portion extending between said elongated sleeve and said elongated fixing plate, said elongated rib portion being connected to said elongated sleeve and to said elongated fixing plate along substantially their entire lengths and extending in parallel with said imaginary tangential contact plane, and wherein said gear assembly includes a stop means positioned near a portion of an outer surface of said elongated sleeve which faces away from said gear wheel, said elongated rib portion being sufficiently flexible to enable said sleeve to move and contact said stop means upon engagement of said cylindrical gear wheel and said gear pinion, thus reducing backlash therebetween.

2. A gear assembly according to claim 1, wherein said elongated sleeve provides a cylindrical outer surface and wherein said stop means provides a cylindrical stop surface against which the cylindrical outer surface of said elongated sleeve can move.

3. A gear assembly according to claim 1, wherein said first roller bearing consists of a taper roller bearing and said second roller bearing consists of a cylindrical roller bearing.

4. A gear assembly according to claim 1, further including a damping member of elastic material between said sleeve and said gear housing for damping of oscillations in the sleeve.

5. A gear assembly according to claim 1, including a case to which said fixing means is attached, said case providing said stop face, said case being fixedly connected to said gear housing.

6. A gear assembly according to claim 1, wherein the teeth of at least one of said gear pinion and said gear wheel have a face crowning which, while maintaining the correct engagement of teeth, permits a limited angular displacement of said shaft.

* * * * *